United States Patent [19]

Morishita et al.

[11] Patent Number: 5,081,394

[45] Date of Patent: Jan. 14, 1992

[54] BLACK MATRIX COLOR PICTURE TUBE

[75] Inventors: Hajime Morishita, Tokyo; Nobuaki Hayashi, Saitama; Saburo Nonogaki, Tokyo; Masahiro Nishizawa; Kiyoshi Miura, both of Mobara; Teruki Suzuki, Funabashi, all of Japan

[73] Assignee: Hitachi, Ltd., Tokyo, Japan

[21] Appl. No.: 238,497

[22] Filed: Aug. 31, 1988

[30] Foreign Application Priority Data

Sep. 1, 1987 [JP] Japan .................. 62-216426
Oct. 30, 1987 [JP] Japan .................. 62-273141

[51] Int. Cl.⁵ .............................. H01J 29/10
[52] U.S. Cl. .......................... 313/466; 313/473; 313/479; 313/474; 358/252; 430/25
[58] Field of Search ............. 313/466, 471, 473, 474, 313/479, 461; 358/252; 430/25, 27, 28

[56] References Cited

U.S. PATENT DOCUMENTS 3,362,804  1/1968  Hamilton .................. 430/27
4,681,824  7/1987  Tomita .................... 430/25 X
4,857,429  8/1989  Hayashi et al. ........... 430/25 X

FOREIGN PATENT DOCUMENTS 53-126861  11/1978  Japan .
57-115749   7/1982  Japan .

Primary Examiner—Donald J. Yusko
Assistant Examiner—Michael Horabik
Attorney, Agent, or Firm—Fay, Sharpe, Beall, Fagan, Minnich & McKee

[57] ABSTRACT

A black matrix color picture tube has a phosphor layer and black matrix layer formed on the inner surface of the faceplate. A layer of glass having a low softening point is provided between the phosphor layer and the inner surface of the faceplate and between the black matrix layer and the inner surface of the faceplate. The softening point of the glass is below the temperature at which the tube is subjected during a frit baking step employed in the fabrication of the tube. For example, a borophosphate glass is used as the layer of glass having a low softening point.

4 Claims, 2 Drawing Sheets

BLACK MATRIX COLOR PICTURE TUBE

BACKGROUND OF THE INVENTION

This invention relates to a black matrix color picture tube and a method for its fabrication and particularly to a high-contrast black matrix color picture tube and a method for its fabrication.

The phosphor screen of a so-called black matrix color picture tube has on its faceplate the formation of a non-luminous, light-absorptive powder layer (black matrix) for partly covering the phosphor layer so that the phosphor layer appears through aperture sections (matrix holes).

Among the two major methods of forming such a phosphor screen, one is the wet process, which is typically as follows. On the inner surface of the faceplate, a photoresist is applied to form a film, and portions of the photoresist film where phosphor will be laid are hardened. After the development process, carbon suspension is applied to it to form a carbon application film and, thereafter, a removal agent is poured onto it to remove the hardened photoresist together with the overlaying carbon layer so that matrix holes are formed. Next, the photoresist slurry including phosphor is applied to form a film and the application film at positions where the phosphor will be laid is hardened. Following the development process, a phosphor layer is formed in the matrix holes. For making a phosphor layer of three colors, i.e., red, green and blue, the above process is repeated for each type of phosphor. Finally, the baking process is conducted to eliminate organic substances.

The second is the dry process which was developed by some of the inventors of the present invention (see JP-B-57-20651 which corresponds to JP-A-53-126861). This method typically includes the processes of forming an application film including aromatic diazonium salt, which exhibits adhesion or tackiness by being exposed to light, on the faceplate, and exposing it to the light radiation so that phosphor is deposited in the irradiated portions. For making a phosphor layer of three colors, the light irradiation and following processes are repeated three times. Next, the entire application film is exposed to light and carbon is deposited in portions other than the phosphor layer so that a black matrix is formed. Finally, a fixing process using a polymer aqueous solution, etc. is conducted so that these layers are made insoluble in water. In case of a striped phosphor pattern, it is also possible to form a black matrix layer before forming the phosphor layer.

In the formation of a phosphor screen by any of the above methods, there is created a gap partly between the phosphor layer and black matrix layer and the faceplate. When the light is incident from the outside (from the viewer's side), part of the light is reflected on the outer surface of the faceplate, and, because of the presence of the gap, part of the light is further reflected on the inner surface. The inner surface reflection, which depends on the refractivity of the faceplate, is over as much as 3–5% of the incident light. Therefore, suppression of the inner surface reflection is desired.

A method of reducing the inner surface reflection has been proposed, in which a material having virtually the same refractivity as the faceplate material, e.g., water glass, is filled in the gap between the faceplate and the black matrix layer. See, for example, JP-A-57-115749. This conventional technique, however, has a problem in that the water glass filled in the black matrix layer penetrates into the phosphor layer, causing a decrease in the light intensity of the phosphor.

Sticking of water glass to the phosphor surface by capillary action is unavoidable, and conceivably electron rays emitted by phosphor are retarded by the water glass, resulting in a decreasing intensity of the phosphor. Water glass does not much exist in the portion of the phosphor layer, but instead bubbles rest there and the inner surface reflection cannot be prevented completely in this portion. It is also undesirable to use water glass because of the mismatch of refractivity between water glass and the glass of the faceplate.

SUMMARY OF THE INVENTION

An object of this invention is to provide a black matrix color picture tube and a method of fabricating the same, which reduces the reflection on the inner surface of the faceplate without sacrificing the intensity of the phosphor.

According to one aspect of the present invention, in a black matrix color picture tube having a phosphor layer and a black matrix layer on the inner surface of a faceplate, a layer of glass of a low softening point is formed between the inner surface of the faceplate and the black matrix layer, so that the black matrix layer optically contacts the faceplate.

According to another aspect of the present invention, in a black matrix color picture tube having a phosphor layer and a black matrix layer on the inner surface of the faceplate, a layer of glass of a low softening point is formed between the inner surface of the faceplate and the phosphor layer and between the inner surface of the faceplate and the black matrix layer, so that the black matrix layer and the phosphor layer optically contact the faceplate. In consequence, the reflectivity of the faceplate is lowered, and a high-contrast picture tube is realized.

In the fabricating method according to one embodiment of the invention, formation of a phosphor screen includes a step of forming a glass layer having a low softening point on the inner surface of faceplate, a step of forming a black matrix layer and phosphor layer on the glass layer, and a step of softening the glass layer by heating.

In the case of forming a glass layer of a low softening point only between the black matrix layer and the faceplate based on this invention, the following method is preferably followed. The method is characterized by the formation of a phosphor screen including a step of applying a film of photoresist on the inner surface of a faceplate a step of forming a desired film pattern by exposing the applied film to light using a shadow mask followed by development, a step of forming a glass layer of low softening point on the faceplate and the applied film pattern, a step of forming a black matrix layer on the glass layer, a step of removing the applied film pattern together with the glass layer and black matrix layer formed on it using a removal agent, a step of softening the glass layer by heating, and a step of forming a phosphor layer on the portion of the applied film where the pattern has been removed.

In any of the above methods, if phosphor layers of three different colors are to be formed, the step of phosphor layer formation is conducted three times for the three types of phosphor. The methods may be based either on the wet process or dry process.

In the former method, the wet process and dry process may be employed for forming the black matrix layer and phosphor layer respectively, or both layers may be formed by either the wet process or the dry process.

The low softening point glass is preferably one having a softening point in the range of 200°–450° C., or more preferably in the range of 200°–430° C. Namely, the softening temperature is chosen to be below the frit baking temperature which is slightly above 450° C. in the fabrication of color picture tubes. The low softening point glass needs to be nonaqueous or aqua-resistive.

An example of low softening point glass is borophosphate glass (see Glass Technology, Vol. 17, No. 2, pp. 66-71). A preferable composition of glass used for this invention includes 30–70 mol % of $P_2O_5$, 2–10 mol % of $B_2O_3$, with an alkaline earth metal and alkaline metal oxide as the remaining components, for example. Too much or too little of the $P_2O_5$ results in a crystallization of the glass, and too much $P_2O_5$ further deteriorates the phosphors. Inclusion of MgO and/or, CaO is favorable for preventing the blackening of the phosphor. However, too much MgO or CaO tends to raise the softening point, although resistivity against water is improved. In order to prevent the discoloring of glass attributable to the electron rays, it is preferable for the glass composition to include 0.01–1 mol % of $CeO_2$.

The following is an example of a composition of a low softening glass that is preferably used in practicing this invention.

$P_2O_5$—35–50 mol %, $B_2O_3$—3–7 mol %,
MgO—5–15 mol %, CaO—5–15 mol %,
$Li_2O$—5–25 mol %, $Na_2O$—5–25 mol %,
BaO—0–10 mol %, $K_2O$—0–10 mol %,
$CeO_2$—0.01–1 mol %

Glass of the above composition has a refractivity in the range of 1.50–1.55. To eliminate the inner surface reflection of the faceplate almost completely, it is especially desirable to use glass with a refractivity in the range of 1.52–1.54.

Use of glass including heavy metal such as Pb and Bi is unfavorable, since these heavy metals deteriorate the phosphors.

Low softening point glass in the form of a powder is more desirable, particularly glass powder with an average particle diameter ranging 0.5–20 μm is desirable.

The thickness of the glass layer is required to such an extent of flattening the roughness at the bottom of the phosphor layer and black matrix layer, and the presence of sole glass layer up to 0.1–60 μm is allowed.

The glass layer is softened by being heated, and it fills the space between the phosphor layer and black matrix layer. If the materials of the glass layer and faceplate have equal refractivity, the inner surface reflection of the face plate is eliminated. Practically, the condition is met unless the refractivities of both parts are greatly different. Generally, low softening point glass has similar refractivity to that of a faceplate material, except for special glass, and therefore the inner surface reflection of the faceplate can virtually be nullified. This point will further be described with reference to the, drawings FIG. 2 shows a schematic partial cross-section of a faceplate used in a conventional color picture tube. Most of the light 1 is incident to the interior, although part of it is reflected on the surface of the faceplate 3. If there is a space between the faceplate 3 and phosphor layer 5 or black matrix layer 4, part of the incident light 1 is reflected on the inner surface of faceplate 3 to produce reflected light, indicated by light rays 2 and 2'. However, if the space is filled with low softening point glass 6 as shown in FIG. 1, which shows a partial schematic cross-section of a faceplate of the inventive color picture tube, reflection does not occur on the inner surface of the faceplate 3, and all of the incident light 1 is absorbed by the black matrix layer 4. Since the glass layer and phosphor layer have virtually equal refractivities, the surface of the phosphor layer 5 merely allows a little dispersion and does not reflect the light.

Since the glass layer does not melt at the above-mentioned processing temperature, it does not cover the phosphor layer, and the intensity of the phosphor does not fall.

Next, the formation of a black matrix film by employment of the dry process will be described. This work is done by a sequential process including a step of applying a light-sensitive material, which exhibits adhesion or tackiness by being exposed to light, on the surface of a substrate so as to form a thin layer, a step of exposing the thin layer in its portions of a figure pattern to light so that the exposed portions develop tackiness, and a step of sticking a nonluminous powder, thereby forming a pattern of nonluminous powder. The nonluminous powder pattern forming method is characterized by mixing the nonluminous powder with a low softening point glass powder and sticking the mixture to the exposed portions. The nonluminous powder pattern forming method further includes a subsequent step of developing the light-sensitive material to form a pattern of thin film, a step of forming a nonluminous powder layer on the light-sensitive thin film, and a step of removing the light-sensitive film together with the nonluminous powder layer on it, thereby forming the mixture of the nonluminous powder and low softening point glass powder on the pattern of the light-sensitive thin film.

In the dry process, the formation of the nonluminous powder pattern may be either before or after the formation of the phosphor pattern. However, in the case of a dot pattern of phosphor, the phosphor pattern is preferably formed first for the expedient of forming the exposure pattern. In the case of a striped pattern of phosphor, the patterns may be formed in an arbitrary order. In the wet process, the nonluminous powder pattern is formed first in general.

The mixing ratio of nonluminous powder and glass powder is preferably such that the nonluminous powder is 0.1–7 weight % of the mixture, and is more preferably 0.3–4 weight %. A lesser amount of nonluminous powder below 0.1 weight % spoils the effect of forming a black matrix and allows for the easy formation of pin holes. An excess amount of the powder above 7 weight % spoils the effect of the reduction of the inner surface reflection as shown in Table 1, which shows the results of measurements of reflection attained by varying the quantity of carbon black in the same condition as in FIG. 1, as will be explained later. The inner surface reflectivity represents the value of 5° regular reflection for a 550 nm wavelength.

TABLE 1

| Quantity of carbon black (weight %) | Inner surface reflectivity (%) |
|---|---|
| 0.1 | 1 |
| 0.3 | 0 |
| 0.5 | 0 |
| 0.8 | 0 |
| 1.0 | 0 |
| 1.6 | 0 |

TABLE 1-continued

| Quantity of carbon black (weight %) | Inner surface reflectivity (%) |
|---|---|
| 4.0 | 0 |
| 4.7 | 0 |
| 5.5 | 1 |
| 7.0 | 2 |
| 10.0 | 4 |
| 17.0 | 4 |

DESCRIPTION OF THE PREFERRED EMBODIMENTS

EMBODIMENT 1

The following materials were metered, mixed in an agate mortar, heated gradually from room temperature in a crucible, and baked at 800° C. for one hour in air. Borophosphate glass was yielded with the composition (mol %) of: $45P_2O_5.5B_2O_3.11MgO.11CaO.9Li_2O.19Na_2O$. The softening point was 400° C. (Generally, the measurement of the softening point involves an error of around ±10° C.). The glass was powdered.

Phosphoric acid (85% $H_3PO_4$)—51.88 g, Boron oxide ($B_2O_3$)—1.83 g, Basic magnesium carbonate (($MgCO_3$)$_4$.$Mg(OH)_2$.$5H_2O$)—5.46 g, Calcium carbonate ($CaCO_3$)—5.69 g, Lithium carbonate ($LiCO_3$)—3.27 g, Sodium carbonate ($Na_2CO_3$)—9.99 g.

On the inner surface of the faceplate, the aqueous solution including 1% polyvinyl alcohol, 2% diethylene glycol and 2% diglycerol was applied by rotatary application to a thickness of about 1 μm. The applied surface was dusted with the glass powder so that a glass powder layer was formed. The faceplate was heated gradually from room temperature to 450° C. for 30 minutes, and a borophosphate glass layer with a thickness of about 10 um was formed. Photoresist was applied to the faceplate to form a film, and the light was irradiated through a shadow mask to positions where phosphor dots of three types (R, G, B) would be formed. Through the development process, hardened photoresist dots were formed. Colloidal black carbon suspension was applied to the inner surface of the faceplate, and it was dryed. By pouring a removal agent to remove the hardened photoresist dots together with carbon on them, matrix holes were formed.

Through the application, light exposure and development using the photoresist phosphor slurry for the three types of phosphors sequentially, as in the conventional method, phosphor layers were formed.

The above process was followed by aluminizing, frit baking, and mounting of electron guns to complete a color picture tube. The glass layer was softened in the process of frit baking.

Figure 1:
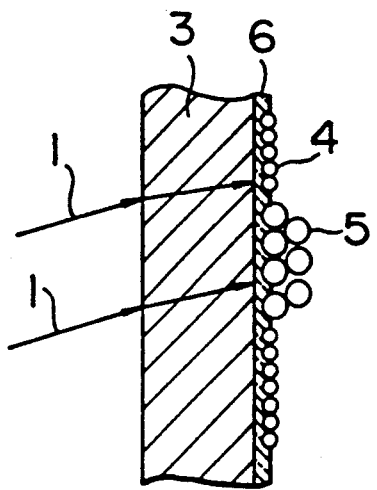
FIG. 1 is a partial schematic cross-sectional diagram showing the inventive color picture tube faceplate.
Figure 2:
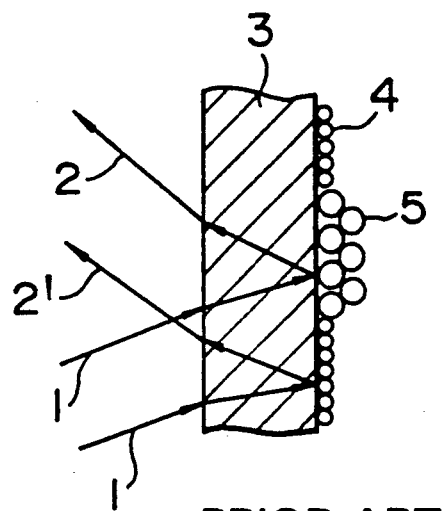
FIG. 2 is a partial schematic cross-sectional diagram showing the conventional color picture tube faceplate.
Figure 3:
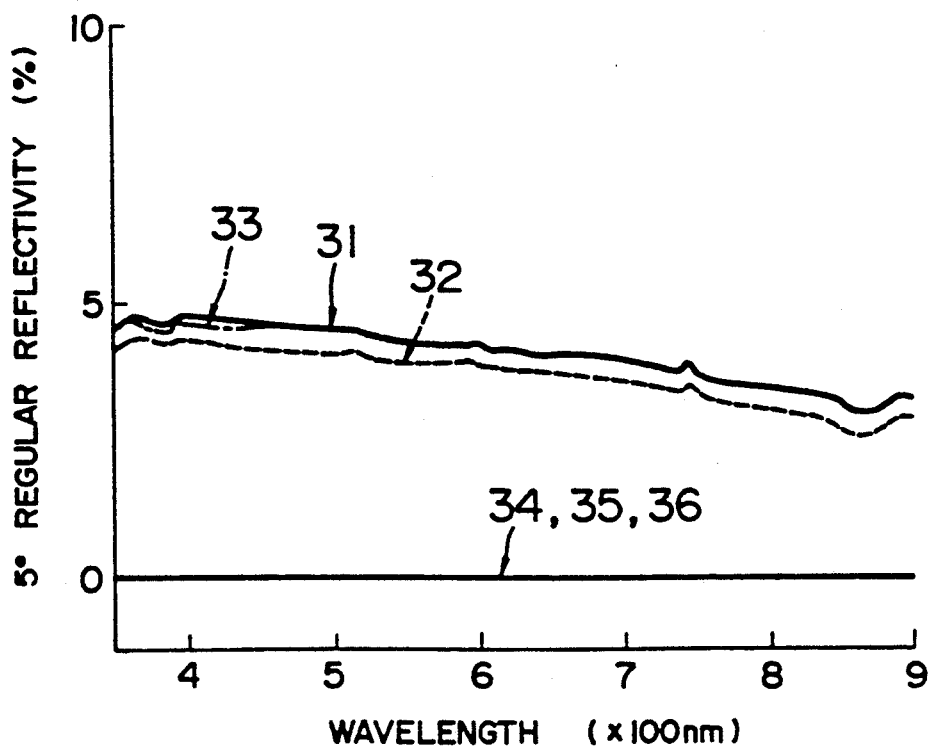
FIGS. 3 and 4 are diagrams of reflectivity used to explain the present invention.
Figure 4:
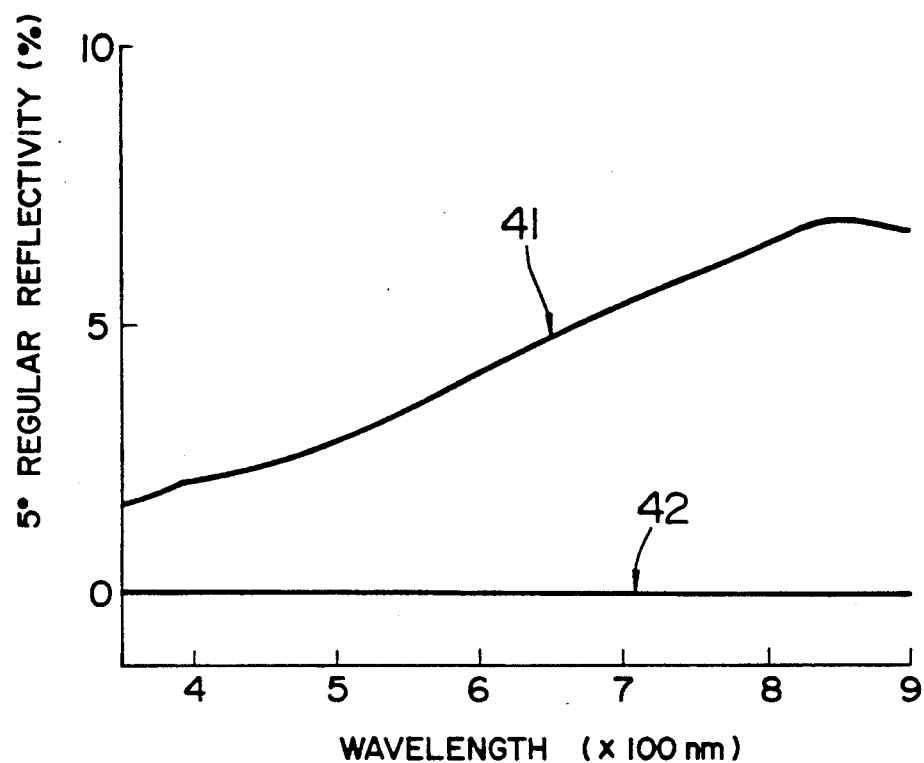

For the comparison purposes, a conventional color picture tube, in which the borophosphate glass layer was absent and the rest of the tube was constructed according to the inventive method, was fabricated. FIG. 3 shows the result of measurement of 5° regular reflection on the red, green and blue phosphor layers of both picture tubes. Indicated by 31, 32 and 33 are reflectivities of the conventional blue, red and green phosphor screen, while 34, 35 and 36 indicate the counterparts of this invention. As will be appreciated from the figure, the inventive phosphor screen has almost no reflectivity on all phosphor layers in a wide range of wavelength. FIG. 4 shows the reflectivity on the black matrix layer. Also in this case, the inventive color picture tube has almost no reflectivity on the black matrix layer. The light release factor of phosphor was 108–112% greater than that of the conventional one.

EMBODIMENT 2

The following materials were used to obtain borophosphate glass of $40P_2O_5.5B_2O_3.12MgO.12CaO.10Li_2O.21Na_2O$. The process was identical to Embodiment 1. The glass has a softening point of 410° C. The measurement result was virtually identical to Embodiment 1.

Phosphoric acid (85% $H_3PO_4$)—46.12 g,
Boron oxide ($B_2O_3$)—1.83 g, Basic magnesium carbonate (($MgCO_3$)$_4$.$Mg(OH)_2$.$5H_2O$)—6.01 g,
Calcium carbonate ($CaCO_3$)—6.26 g,
Lithium carbonate ($LiCO_3$)—3.59 g,
Sodium carbonate ($Na_2CO_3$)—10.99 g.

EMBODIMENT 3

The same process as Embodiment 1 was conducted, except that borophosphate glass was used. The measurement result was virtually identical to Embodiment 1.

TABLE 2

| Composition (mol %) | No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $P_2O_5$ | 35 | 40 | 45 | 50 | 45 | 45 | 45 | 45 | 45 | 45 | 50 | 55 |
| $B_2O_3$ | 5 | 5 | 5 | 5 | 5 | 5 | 5 | 5 | 5 | 5 | 3.6 | 5 |
| MgO | 13.5 | 12.5 | 12 | 9 | 9 | 12.5 | 9 | 11.2 | 7 | 5 | — | 9 |
| CaO | 13.5 | 12.5 | 12 | 9 | 9 | 12.5 | 9 | 11.2 | 7 | 5 | — | 9 |
| BaO | — | — | — | — | 9 | 4.7 | — | — | — | — | — | — |
| $Li_2O$ | 10.5 | 15 | 9 | 7 | 10 | 10 | 7 | 8.8 | 20.8 | 20 | 20 | 7 |
| $Na_2O$ | 22.5 | 14.7 | 16.7 | 20 | 12.7 | 10 | 10 | 18.8 | 15 | 19.75 | 10 | 15 |
| $K_2O$ | — | — | — | — | — | — | 9.7 | — | — | — | 16.4 | — |
| $CeO_2$ | — | 0.3 | 0.3 | — | 0.3 | 0.3 | 0.3 | — | 0.2 | 0.25 | — | — |
| Softening point (°C.) | 410 | 410 | 420 | 410 | 400 | 420 | 410 | 400 | 360 | 320 | 280 | 370 |

EMBODIMENT 4

Light-sensitive polymer compound was applied by rotation on the inner surface of the faceplate. Using a super high pressure mercury lamp as a light source, positions where phosphor dots of red, green and blue would be put were exposed to the light through a shadow mask. After development in water, 3-color dots made of light-hardened resist were obtained. After the panel had been dried, an adhesive of the following composition was applied thinly and evenly.

Composition of adhesive:
Zinc chloride—3%; Polyvinyl alcohol—0.15%; Water—rest

Subsequently, powder of borophosphate glass was dusted to form a powder layer. After exposure to ammonia vapor, the plate was washed in water, and a fixed layer of borophosphate glass was formed. Colloidal liquid of black carbon was applied over the layer, and it was dried. After the light-hardened photoresist dots had been processed using a removal agent, the dots and borophosphate glass and carbon on it were removed using a hot water spray, and black matrix holes were obtained. Next, by completing the conventional application, exposure, development and dry processes for each of the 3-color phosphors sequentially, phosphor films were formed. Finally, aluminizing, frit baking and mounting of electron guns were conducted following the conventional method, and a black matrix color picture tube was completed.

EMBODIMENT 5

The glass produced in Embodiment 1 was powdered and mixed with black carbon in the following proportion, and the following mixture was obtained.

Glass of low softening point—25 g;
Carbon black—1 g

EMBODIMENT 6

A film of the following composition was applied as a light-sensitive material on a glass substrate.

Zinc chloride double salt of N,N-dimethylaniline-p-diazonium chloride—95 weight %; Polyvinyl alcohol—5 weight %

Using a super high pressure mercury lamp, the film was exposed to the ultraviolet rays through a mask, and the exposed portions developed stickiness.

The black powder produced in Embodiment 5 was dusted and developed in air blow. The black powder sticked in the stickiness portion, and a pattern of nonluminous powder layer was formed. Following the process in ammonia vapor and then washing in water, the powder layer was fixed, and it was baked at 430° C. for 30 minutes. A pattern of a nonluminous powder layer, with the inner surface reflectivity being lowered, was obtained.

It was tried to expose an application film of light-sensitive material to a pattern of ultraviolet rays in advance and, following the deposition of phosphor on the exposed portions, the entire surface was exposed, which was followed by dusting of the black powder produced in Embodiment 5, development, ammonia process, washing in water, and baking at 430° C. for 30 minutes, as in the same manner as Embodiment 5, and as a result the intensity of the phosphor was not spoiled at all and the inner surface reflectivity was lowered.

Figure 5:
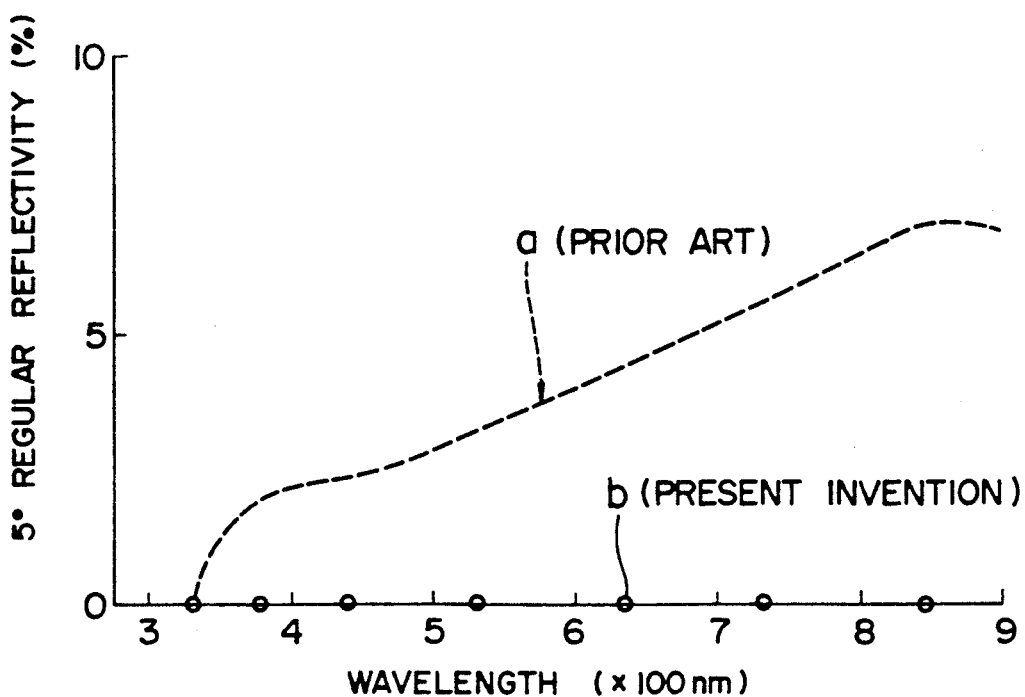
FIG. 5 is a spectral diagram of 5° regular reflection on the nonluminous powder layer resulting from the inventive method and conventional method.

FIG. 5 shows the reduction of inner surface reflectivity. In the figure, indicated by (a) is the spectrum of 5° regular reflectivity on the nonluminous powder layer produced by the conventional method (wet process), and (b) is the result accomplished by the present invention. The measurement of reflectivity was conducted by making the light incident at 5° to normal on the surface. The reflectivity of the glass surface was subtracted from the measurement result. The same result as when the film produced by the inventive method in close contact with the substrate was reached, and the inner surface reflectivity was nullified at any wavelength.

I claim:

1. A black matrix color picture tube having a phosphor layer and a black matrix layer on an inner surface of a faceplate, comprising said tube having a layer of glass between the inner surface of said faceplate and said phosphor layer and between the inner surface of said faceplate and said black matrix layer, wherein said glass of said layer is a borophosphate glass including 30–70 mol % of $P_2O_5$ and 2–10 mol % of $B_2O_3$, and further includes alkaline earth metal and alkaline metal oxide as remaining components.

2. A black matrix color picture tube having a phosphor layer and a black matrix layer on an inner surface of a faceplate, comprising said tube having a layer of glass between the inner surface of said faceplate and said phosphor layer and between the inner surface of said faceplate and said black matrix layer, wherein said glass of said layer is a borophosphate glass with a composition including 35–50 mol % of $P_2O_5$, 3–7 mol % of $B_2O_3$, 5–15 mol % of MgO, 5–15 mol % of CaO, 5–25 mol % of $Li_2O$, 5–25 mol % of $Na_2O$, 0–10 mol % of BaO, 0–10 mol % of $K_2O$, and 0.01–1 mol % of $CeO_2$.

3. A frit baked black matrix color picture tube, comprising said tube having a faceplate with an inner surface, and a phosphor layer and a black matrix layer on the inner surface of the faceplate, said tube having a layer of glass between the inner surface of said faceplate and said black matrix layer, wherein the glass of said layer has a softening point lower than a predetermined frit baking temperature and wherein said glass comprises a borophosphate glass including 30–70 mol % of $P_2O_5$ and 2–10 mol % of $B_2O_3$, and further includes alkaline earth metal and alkaline metal oxide as remaining components.

4. A frit baked black matrix color picture tube, comprising said tube having a faceplate with an inner surface, and a phosphor layer and a black matrix layer on the inner surface of the faceplate, said tube having a layer of glass between the inner surface of said faceplate and said black matrix layer, wherein the glass of said layer has a softening point lower than a predetermined frit baking temperature and wherein said glass comprises borophosphate glass with a composition including 35–50 mol % of $P_2O_5$, 3–7 mol % of $B_2O_3$, 5–15 mol % of MgO, 5–15 mol % of CaO, 5–25 mol % of $Li_2O$, 5–25 mol % of $Na_2O$, 0–10 mol % of BaO, 0–10 mol % of $K_2O$, and 0.01–1 mol % of $CeO_2$.

* * * * *